United States Patent
Muehlbacher et al.

(10) Patent No.: US 6,783,624 B2
(45) Date of Patent: Aug. 31, 2004

(54) MODULAR HEADLINER ASSEMBLY AND METHOD OF MAKING SAME

(75) Inventors: Richard Muehlbacher, Grassau (DE); Thomas Greiner, Bruckmaihl (DE)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/297,116

(22) PCT Filed: Mar. 27, 2001

(86) PCT No.: PCT/US01/09728

§ 371 (c)(1),
(2), (4) Date: Dec. 2, 2002

(87) PCT Pub. No.: WO01/94155

PCT Pub. Date: Dec. 13, 2001

(65) Prior Publication Data

US 2003/0211290 A1 Nov. 13, 2003

Related U.S. Application Data

(60) Provisional application No. 60/210,195, filed on Jun. 8, 2000.

(51) Int. Cl.[7] .............................................. B32B 31/00
(52) U.S. Cl. ..................... 156/300; 156/288; 156/309.6
(58) Field of Search .............................. 156/309.6, 297, 156/298, 299, 300, 245; 296/214

(56) References Cited

U.S. PATENT DOCUMENTS

| | | | |
|---|---|---|---|
| 4,052,241 A | * 10/1977 | Walter | ........................ 156/245 |
| 4,848,829 A | 7/1989 | Kidd | |
| 5,016,934 A | 5/1991 | Pelz | |
| 5,120,593 A | 6/1992 | Kurihara | |
| 5,411,688 A | 5/1995 | Morrison et al. | |
| 5,529,742 A | 6/1996 | Strapazzini | |
| 5,688,022 A | 11/1997 | Adams et al. | |
| 6,070,902 A | 6/2000 | Kowalski et al. | |
| 6,086,145 A | 7/2000 | Wandyez | |
| 6,106,303 A | 8/2000 | Wojewnik | |
| 6,120,091 A | 9/2000 | Reich et al. | |
| 6,126,228 A | 10/2000 | Davis, Jr. et al. | |
| 6,394,538 B1 | * 5/2002 | Murdock | ..................... 296/214 |
| 6,475,937 B1 | * 11/2002 | Preisler et al. | .............. 442/370 |

FOREIGN PATENT DOCUMENTS

| | | |
|---|---|---|
| EP | 0 979 760 A1 | 2/2000 |
| JP | 11-139238 | 5/1999 |
| WO | WO 98/36943 | 8/1998 |
| WO | WO 98/42536 | 10/1998 |
| WO | WO 00/05102 | 2/2000 |

* cited by examiner

*Primary Examiner*—Jeff H. Aftergut
*Assistant Examiner*—John L. Goff
(74) *Attorney, Agent, or Firm*—Bill C. Panagos

(57) ABSTRACT

A modular headliner assembly (10) includes a headliner (12) having an appearance surface (13) and a back surface (14). At least one component (19, 20, 22, 23) is disposed adjacent the back surface (14) of the headliner (12). Furthermore, an integration sheet (24) is attached to the back surface for securing the at least one component (19, 20, 22, 23) to the headliner (12). A method of manufacturing the headliner (12) assembly is also disclosed.

18 Claims, 2 Drawing Sheets

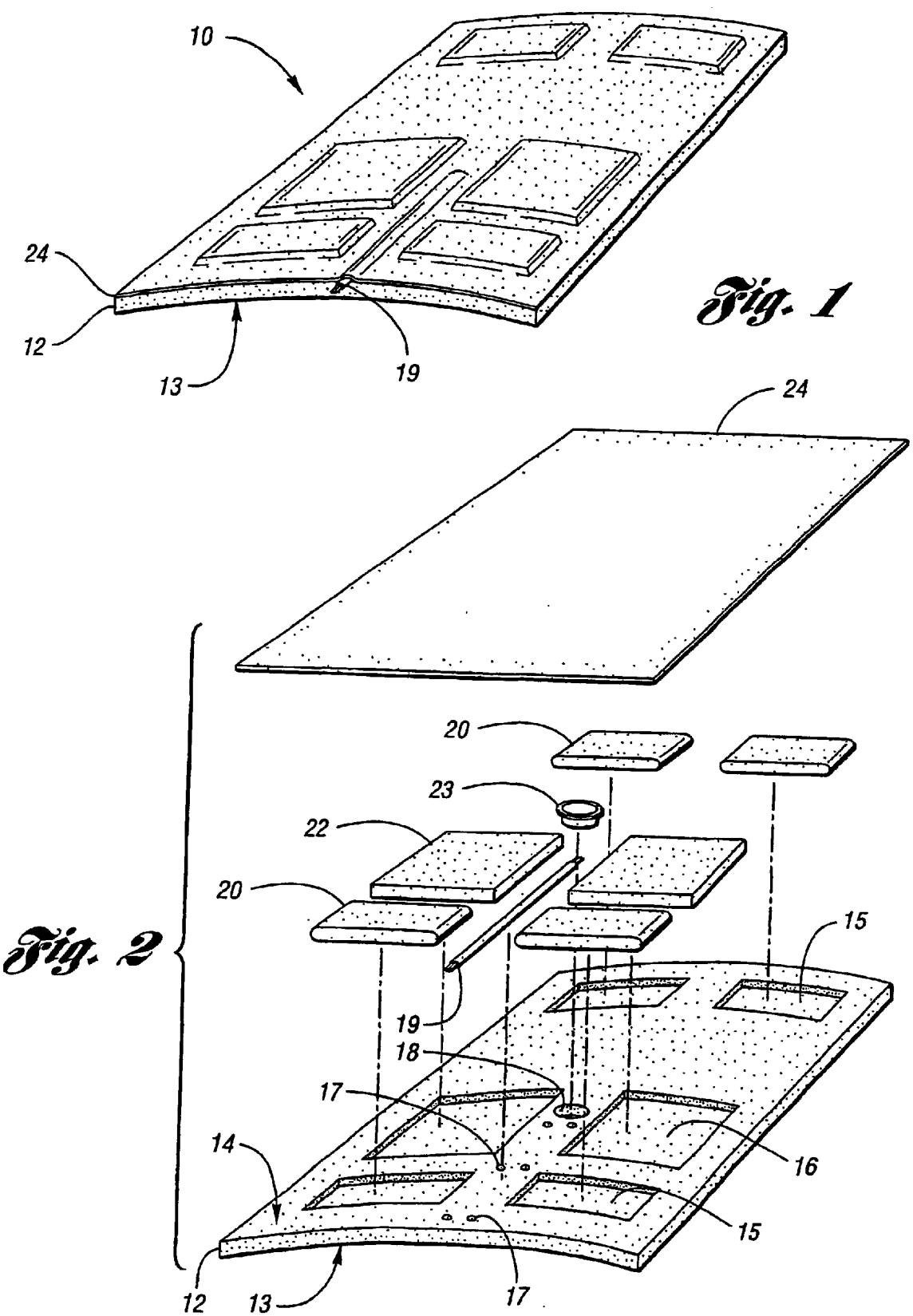

MODULAR HEADLINER ASSEMBLY AND METHOD OF MAKING SAME

CROSS REFERENCE TO RELATED APPLICATION

This application claims the benefit of U.S. Provisional Application Ser. No. 60/210,195 filed Jun. 8, 2000.

BACKGROUND OF THE INVENTION

1. Field of the Invention

The invention relates to a modular headliner assembly having an integration sheet, and a method of making such a headliner assembly.

2. Background Art

It is desirable to provide headliner assemblies with various components, such as energy absorbing members and wire harnesses, attached to preformed headliners. Such headliner assemblies, which are known as modular headliner assemblies, are typically manufactured by individually attaching the components to the headliners with hot melt adhesives. Such a process, however, is time-consuming. Furthermore, the adhesives are expensive and increase the weight of the headliner assemblies.

SUMMARY OF THE INVENTION

The invention addresses the shortcomings of the prior art by providing a modular headliner assembly that can be manufactured without hot melt adhesives. The headliner assembly includes a headliner having an appearance surface and a back surface. At least one component is disposed adjacent the back surface of the headliner. Furthermore, an integration sheet is attached to the back surface for securing the at least one component to the headliner

BRIEF DESCRIPTION OF THE DRAWINGS

FIG. 1 is a top perspective view of a headliner assembly according to the invention;

FIG. 2 is an exploded perspective view of the headliner assembly;

DETAILED DESCRIPTION OF THE PREFERRED EMBODIMENT(S)

Figure 3:
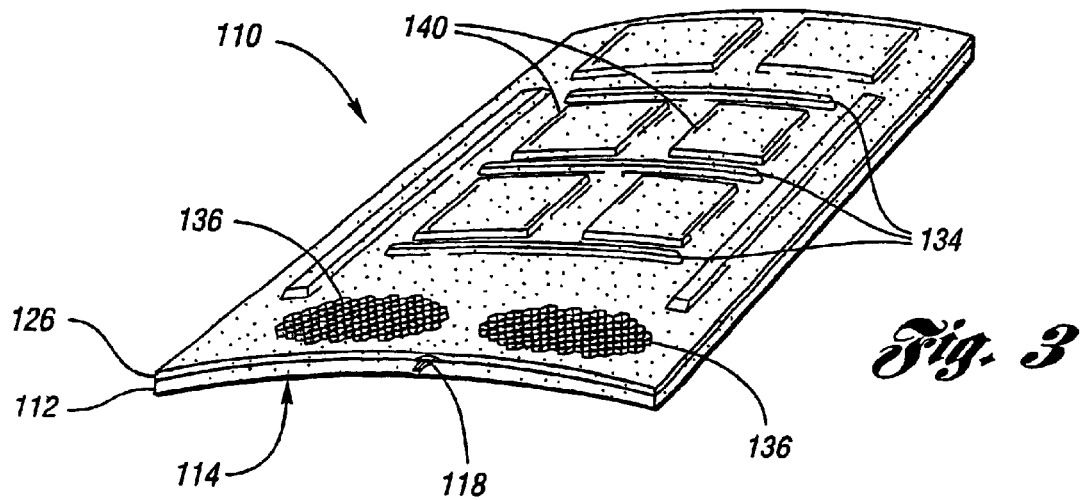
FIG. 3 is a top perspective view of a second embodiment of the headliner assembly.

FIGS. 1 and 2 show a modular headliner assembly 10 according to the invention for use with a motor vehicle. The headliner assembly 10 includes a headliner 12 having an appearance surface 13 and a back surface 14. The appearance surface 13 is viewable from a passenger compartment of the vehicle when the headliner 10 is installed in the vehicle. In addition, the headliner 12 preferably, but not necessarily, includes a plurality of locating features or elements. For example, the headliner 12 may include recesses 15 and 16, projections such as bumps 17, and an aperture 18.

A plurality of components are disposed on the back surface 14 of the headliner 12. For example, the headliner assembly 10 may include a wire harness 19, energy absorbing members such as head impact blocks 20, acoustic members such as acoustic mats 22, and a light 23. These components are preferably, but not necessarily, positioned on the headliner 12 using the recesses 15 and 16, bumps 17 and aperture 18 as explained below in greater detail.

The headliner assembly 10 further includes an integration sheet 24 attached to the back surface 14 for securing the components 19, 20, 22 and 23 to the headliner 12. The integration sheet 24 is preferably relatively thin, with a thickness in the range of 0.1 millimeters (mm) to 1 mm, so that the integration sheet 24 may easily be attached to the headliner 12. Alternatively, the integration sheet 24 may have any suitable thickness. Furthermore, the integration sheet 24 may comprise any suitable material that is bondable to the headliner 12. For example, the integration sheet 24 may comprise polypropylene, polyethylene, and/or acryl-butyl-styrene (ABS).

Because the integration sheet 24 effectively secures the components 19, 20, 22 and 23 to the headliner 12, additional adhesives may be eliminated from the headliner assembly 10. Alternatively, adhesives may be used to further bond the integration sheet 24 to the headliner 12, and/or to further bond the components 19, 20, 22 and 23 to the headliner 12. Furthermore, because the integration sheet 24 encapsulates the components 19, 20, 22 and 23, damage to and/or loss of the components 19, 20, 22 and 23 during shipping and handling can be significantly reduced.

A method of manufacturing the headliner assembly 10 will now be described. First, the headliner 12 is formed in any suitable manner and with any suitable materials. For example, the headliner 12 may be formed by molding a polymer substrate or laminate assembly to a cover material such as a cloth layer. During such a molding process, the recesses 15 and 16 and bumps 17 are preferably formed as part of the back surface 14. The aperture 18 is also preferably formed in the headliner 12 during the molding process. Alternatively, the aperture 18 may be formed after the molding process in any suitable manner, such as with a water jet or laser.

Next, the components 19, 20, 22 and 23 are positioned on the back surface 14 using the recesses 15 and 16, bumps 17 and aperture 18. For example, the wire harness 19 may be snap fit between a plurality of bumps 17. The head impact blocks 20 and acoustic mats 22 may also be placed in corresponding recesses 15 and 16, respectively. Furthermore, the light 23 may be positioned in the aperture 18. Alternatively, the components 19, 20, 22 and 23 may be positioned on the back surface 14 using any suitable locating elements. For example, the wire harness 19 may be placed in a recess, and the head impact blocks 20 and acoustic mats 22 may be snap fit or otherwise positioned between projections. As another example, the headliner 12 may be provided with projections in specific locations that are configured as pins, and the head impact blocks 20, acoustic mats 22 and/or other components may be pressed onto the pins so as to pin the head impact blocks 20, acoustic mats 22 and/or other components to the headliner 12.

As yet another alternative or in addition to the above approaches, the components 19, 20, 22 and 23 may be positioned on the back surface 14 using a robotic arm or other automated positioning apparatus, such as a movable carriage mounted on a support member. The components 19, 20, 22 and 23 may also be temporarily held in position by application of localized vacuum pressure, such as by drawing air through localized areas of the headliner 12. Under such an approach, the headliner 12 may be provided with small holes (not shown) extending through the headliner 12 in areas where components 19, 20, 22 or 23 are to be positioned, so as to facilitate application of the vacuum pressure.

The integration sheet 24 is then positioned over the back surface 14 and the components 19, 20, 22 and 23. The integration sheet 24 may be configured to cover the entire back surface 14, or only a portion of the back surface 14. Preferably, the integration sheet 24 is relatively flexible, such as a flexible film, so that the integration sheet 24 may be easily positioned over the back surface 14 and components 19, 20, 22 and 23. Alternatively, the integration sheet 24 may be relatively rigid.

Next, the integration sheet 24 is formed around the components 19, 20, 22 and 23, and is attached to the back surface 14 so as to secure the components 19, 20, 22 and 23 to the headliner 12. For example, the integration sheet 24 may be heated in any suitable manner such as by blowing heated air over the integration sheet 24. The integration sheet 24 may then be vacuum formed to the headliner 12 by drawing air through the headliner 12 such that the integration sheet 24 is drawn toward the back surface 14. Next, the integration sheet 24 may be cooled so as to effectively secure the components 19, 20, 22 and 23 to the headliner 12. Preferably, the integration sheet 24 fuses or bonds directly to the headliner 12. An adhesive such as glue, however, may be applied to the integration sheet 24 and/or headliner 12 to further attach the integration sheet 24 to the headliner 12.

Alternatively, the integration sheet 24 may be attached to the headliner 12 by heating the integration sheet 24, and allowing the integration sheet 24 to form around the components 19, 20, 22 and 23 and to bond to the headliner 12. For example, the integration sheet 24 may be configured to shrink upon application of heat so as to encapsulate the components 19, 20, 22 and 23. With this approach, it is not necessary to vacuum form the integration sheet 24 to the headliner 12. Again, however, an adhesive such as glue may be applied to the integration sheet 24 and/or headliner 12 to further attach the integration sheet 24 to the headliner 12.

Figure 4:
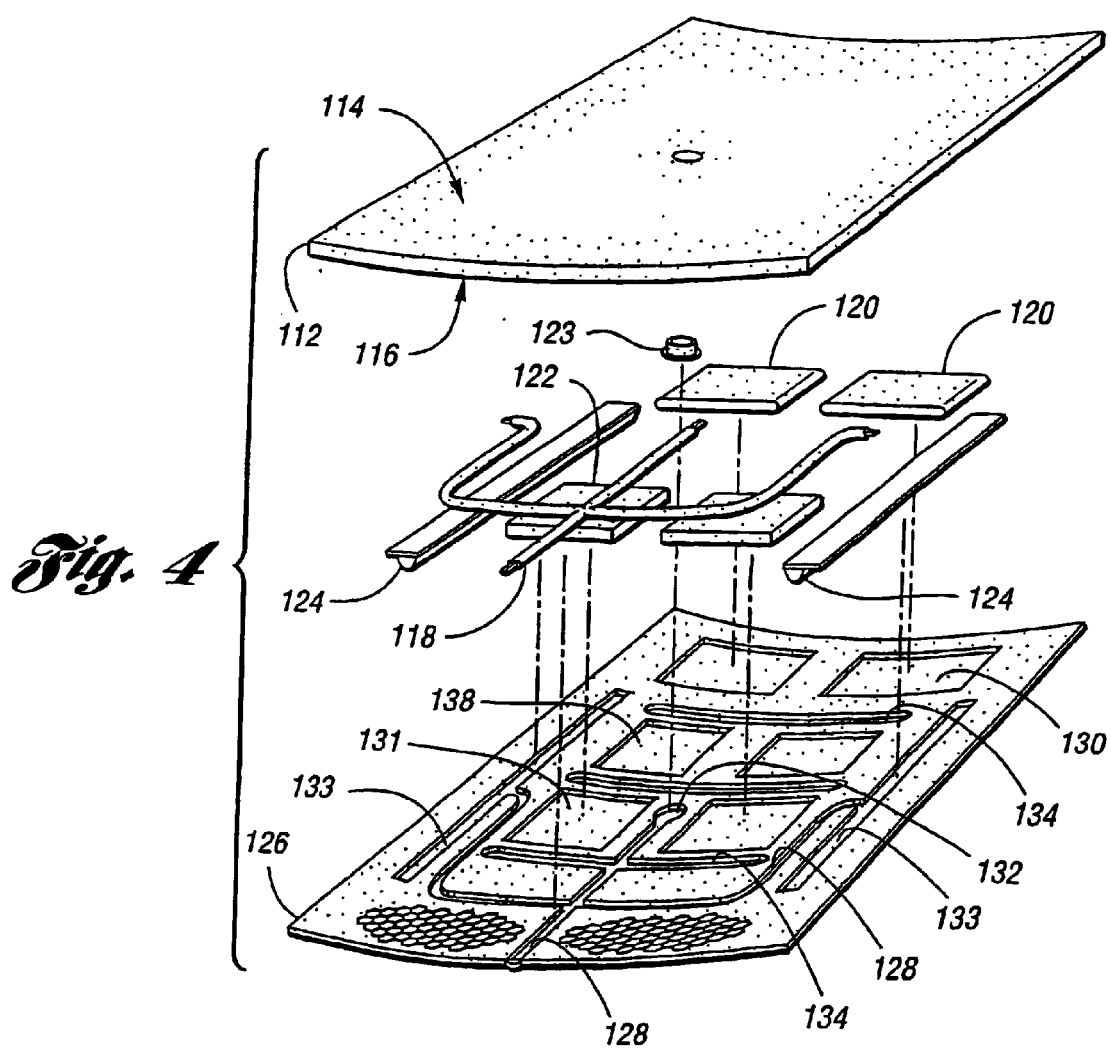
FIG. 4 is an exploded perspective view of the headliner assembly of FIG. 3, with the headliner assembly inverted to show a desired manufacturing orientation.

FIGS. 3 and 4 show a second embodiment 110 of the headliner assembly that includes a headliner 112 having an appearance surface 114 and a back surface 116. The headliner assembly 110 also includes a plurality of components disposed on the back surface 116 of the headliner 112. For example, the headliner assembly 110 may include a wire harness 118, head impact blocks 120, acoustic mats 122 and a light 123. Furthermore, the headliner assembly 110 may include one or more air bag modules such as air curtain modules 124 disposed on the back surface 116.

The headliner assembly 110 further includes an integration sheet 126 for positioning the components 118–124 on the back surface 116, and for securing the components 118–124 to the headliner 112. The integration sheet 126 preferably includes suitable locating features or elements for positioning the components 118–124. For example, the integration sheet 126 may include grooves 128 for receiving the wire harness 118; recesses 130, 131 and 132 for receiving the head impact blocks 120, acoustic mats 122 and light 123, respectively; and channels 133 for receiving the air curtain modules 124. The grooves 128, recesses 130–132 and channels 133 may also be configured to provide an interference fit with the corresponding components 118–124. For example, the opening of the grooves 128 may be slightly smaller than the diameter of the wire harness 118 such that the wire harness 118 may be snapped into the grooves 128. Furthermore, the channels 133 are preferably relatively rigid and are configured to facilitate deployment of the air curtain modules 124 by inhibiting upward deployment. Alternatively, the integration sheet 126 may be provided with any suitable locating elements, such as dimples and apertures, for positioning the components 118–124. As yet another alternative, the headliner 112 may also be provided with locating elements such as described above with respect to the headliner 12.

The integration sheet 126 also has a plurality of integrally formed reinforcement ribs 134 for increasing stiffness of the headliner assembly 110. The ribs 134 are relatively rigid and are especially useful for providing additional support if the headliner assembly 110 includes numerous heavy components. Furthermore, the ribs 134 may have any suitable configuration. For example, each rib 134 may be solid, hollow, or include fused portions such as fused side wall portions.

The integration sheet 126 also includes a plurality of integrally formed energy absorbing members 136. While the energy absorbing members 136 may have any suitable configuration, each energy absorbing member 136 preferably has an egg crate or honeycomb configuration that is collapsible upon impact so as to absorb energy. As shown in FIG. 3, the energy absorbing members 136 also preferably extend upwardly. Alternatively, the energy absorbing members 136 may extend downwardly toward the headliner 112. Furthermore, the integration sheet 126 has a plurality of cavities 138 that form acoustic chambers 140 when the integration sheet 126 is attached to the headliner 112.

The integration sheet 126 is preferably relatively thin, with a thickness in the range of 0.5 mm to 2 mm. Alternatively, the integration sheet 126 may have any suitable thickness. Furthermore, the integration sheet 126 may comprise any suitable material that is bondable to the headliner 112. For example, the integration sheet 126 may comprise any suitable thermoplastic material such as polypropylene, polyethylene, and/or ABS.

A method of manufacturing the headliner assembly 110 will now be described. First, the headliner 112 is formed in any suitable manner and with any suitable materials, such as described above with respect to the headliner 12. For the headliner assembly 110, however, the headliner 112 may be provided without any recesses or dimples.

Next, the integration sheet 126 is formed in any suitable manner. For example, the integration sheet 126 may be formed by vacuum molding or compression molding. During this step, electrical wiring such as flat printed cable may be incorporated into the integration sheet such that some or all of the wire harness 118 may be eliminated.

The components 118–124 may then be positioned on the integration sheet 126 using the grooves 128, recesses 130–132 and channels 133. Next, the integration sheet 126 and the headliner 112 are positioned adjacent each other so that the integration sheet 126 is proximate the back surface 116 of the headliner 112. If the integration sheet 126 is configured to provide an interference fit with the components 118–124, then the integration sheet 126 may be positioned above the headliner 112. Alternatively, the headliner 112 may be positioned above the integration sheet 126, as shown in FIG. 4. The integration sheet 126 is then attached to the headliner 112 in any suitable manner. For example, the integration sheet 126 may be vacuum formed, heat sealed, and/or sonically welded to the headliner 112. Preferably, the integration sheet 126 fuses or bonds directly to the headliner 112. An adhesive such as glue, however, may also be applied to the integration sheet 126 and/or the headliner 112 to further attach the integration sheet 126 to the headliner 112.

Because the components 118–124 are first positioned on the integration sheet 126, the integration sheet 126 can be used to locate the components 118–124 on the headliner 112.

In addition, because the integration sheet 126 is used to secure the components 118–124 to the headliner 112, the use of additional adhesives such as hot melt adhesives can be eliminated.

When the headliner assembly 110 is installed in a vehicle, the air curtain modules 124 are preferably also secured to a roof structure or side structure of the vehicle. For example, each air curtain module 124 may be sandwiched between a grab handle and the roof structure so as to secure the air curtain modules 124 to the vehicle.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for manufacturing a headliner assembly for use with a vehicle having a passenger compartment, the method comprising:

forming a headliner having an appearance surface and a back surface, the appearance surface being viewable from the passenger compartment when the headliner assembly is installed in the vehicle, and the back surface being adapted to face away from the passenger compartment;

positioning a component proximate the back surface; and attaching an integration sheet to the back surface after the headliner has been formed so as to secure the component to the headliner, thereby forming the headliner assembly;

wherein the attaching step comprises heating the integration sheet, and allowing the integration sheet to form around the component and to bond to the headliner.

2. The method of claim 1 wherein the forming step comprises forming the headliner such that the back surface includes a component locating feature, and wherein the positioning step includes positioning the component adjacent the component locating feature.

3. The method of claim 1 wherein the forming step comprises forming the headliner such that the headliner includes a plurality of projections, and wherein the positioning step comprises snap fitting the component between the projections.

4. The method of claim 1 wherein the forming step comprises forming the headliner such that the back surface includes a recess, and wherein the method further includes positioning an additional component in the recess.

5. The method of claim 1 wherein the attaching step comprises vacuum forming the integration sheet to the headliner.

6. The method of claim 1 wherein the integration sheet comprises thermoplastic material and has a thickness less than two millimeters.

7. The method of claim 1 wherein the integration sheet comprises a flexible plastic film having a thickness less than 1 millimeter.

8. The method of claim 1 further comprising forming the integration sheet such that the integration sheet includes a component locating feature, and wherein the method includes positioning the component within the locating feature prior to positioning the component proximate the back surface.

9. The method of claim 1 further comprising forming the integration sheet such that the integration sheet includes an integrally formed reinforcement rib.

10. The method of claim 1 further comprising forming the integration sheet such that the integration sheet includes an integrally formed energy absorbing member.

11. The method of claim 1 further comprising forming the integration sheet such that the integration sheet has a plurality of integrally formed reinforcement ribs, a plurality of integrally formed energy absorbing members, a groove, and a thickness less than two millimeters, and wherein the positioning step comprises snap fitting the component in the groove.

12. The method of claim 11 wherein forming the integration sheet comprises forming the integration sheet such that the integration sheet has a channel, and wherein the method further comprises positioning an air bag module in the channel prior to the attaching step.

13. The method of claim 12 wherein the attaching step comprises vacuum forming the integration sheet to the headliner.

14. The method of claim 1 further comprising forming the integration sheet such that the integration sheet includes multiple laterally extending, integrally formed reinforcement ribs.

15. The method of claim 1 wherein the attaching step comprises allowing the integration sheet to shrink such that the integration sheet forms around the component.

16. The method of claim 1 wherein the integration sheet has a thickness of less than two millimeters.

17. The method of claim 1 wherein the integration sheet has a thickness of less than one millimeter.

18. A method for manufacturing a headliner assembly for use with a vehicle having a passenger compartment, the method comprising:

forming a headliner having an appearance surface and a back surface, the appearance surface being viewable from the passenger compartment when the headliner assembly is installed in the vehicle, and the back surface being adapted to face away from the passenger compartment;

positioning a component proximate the back surface; and attaching an integration sheet to the back surface after the headliner has been formed so as to secure the component to the headliner, thereby forming the headliner assembly;

wherein the forming step comprises forming the headliner such that the headliner includes a plurality of projections, and wherein the positioning step comprises snap fitting the component between the projections.

* * * * *